United States Patent
Acevedo et al.

(10) Patent No.: US 9,554,402 B2
(45) Date of Patent: *Jan. 24, 2017

(54) FREEING UP MOBILE NETWORK FOR IMPORTANT PHONE CALLS IN CASE OF DISASTER

(71) Applicant: International Business Machines Corporation, Armonk, NY (US)

(72) Inventors: Daniel Acevedo, Milton, NY (US); Steven M. Jones, Pleasant Valley, NY (US); Michael P. Kreig, White Plains, NY (US); Marie R. Laser, Poughkeepsie, NY (US); Deepti M. Naphade, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/841,762

(22) Filed: Sep. 1, 2015

(65) Prior Publication Data

US 2016/0353488 A1    Dec. 1, 2016

Related U.S. Application Data

(63) Continuation of application No. 14/724,122, filed on May 28, 2015.

(51) Int. Cl.
  *H04W 76/00*   (2009.01)
  *H04W 4/02*    (2009.01)
  *H04W 4/22*    (2009.01)

(52) U.S. Cl.
  CPC ............. *H04W 76/007* (2013.01); *H04W 4/02* (2013.01); *H04W 4/22* (2013.01)

(58) Field of Classification Search
  CPC ...... H04L 47/823; H04W 28/02; H04W 28/16
  (Continued)

(56) References Cited

U.S. PATENT DOCUMENTS

2006/0221891 A1* 10/2006 Schmitz .............. H04L 12/189
                                                       370/328
2011/0116616 A1    5/2011 Selph et al.
(Continued)

OTHER PUBLICATIONS

Gleit et al., "Introducing Safety Check," Facebook Newsroom, Oct. 15, 2014, p. 1-5, http://newsroom.fb.com/news/2014/10/introducing-safety-check/, Accessed on Apr. 17, 2015.*

(Continued)

*Primary Examiner* — Inder Mehra
(74) *Attorney, Agent, or Firm* — Robert C. Bunker

(57) ABSTRACT

According to one exemplary embodiment, a method for reducing load on a mobile network after the occurrence of a disaster event is provided. The method may include receiving a disaster location time. The method may include determining a target area based on the disaster location. The method may include determining target persons located within the target area. The method may include predicting the location of each target person based on historical movement data associated with each target person. The method may include determining a plurality of filtered persons based on the predicted location of each target person and the disaster time. The method may include determining a plurality of safe persons based on the filtered persons and a safety indicator. The method may include sending a safety notification to a plurality of concerned contacts associated with each safe person and blocking network traffic associated with each safe person.

10 Claims, 6 Drawing Sheets

(58) Field of Classification Search
USPC ............ 455/456.1, 456.2, 456.3, 404.1, 414.1,455/422.1, 457, 566, 456.4, 456.5, 456.6, 404.2,455/521; 340/539.2, 727, 539.18, 691.3, 7.48; 701/516, 435, 424, 521; 379/37, 46
See application file for complete search history.

(56) References Cited

U.S. PATENT DOCUMENTS

| | | | |
|---|---|---|---|
| 2012/0208491 A1 | 8/2012 | Imming et al. | |
| 2012/0225636 A1* | 9/2012 | Ernst | H04L 12/585 455/404.2 |
| 2013/0040596 A1 | 2/2013 | Paim et al. | |
| 2013/0053002 A1* | 2/2013 | Hymes | H04M 1/26 455/414.1 |
| 2013/0109362 A1 | 5/2013 | Simms et al. | |
| 2014/0045481 A1 | 2/2014 | Fraley | |
| 2014/0200014 A1* | 7/2014 | Iwai | G08B 27/006 455/450 |
| 2014/0308970 A1* | 10/2014 | Klemm | H04W 4/02 455/456.1 |
| 2014/0327575 A1* | 11/2014 | Rao | G01S 19/05 342/357.63 |
| 2014/0347984 A1* | 11/2014 | Speks | H04W 28/16 370/230 |
| 2015/0071125 A1* | 3/2015 | Wang | H04L 12/1407 370/259 |
| 2015/0195712 A1* | 7/2015 | Pinheiro | H04W 12/08 455/411 |
| 2016/0157253 A1* | 6/2016 | Yamine | H04W 72/10 455/456.2 |

OTHER PUBLICATIONS

IBM, "List of IBM Patents or Patent Applications Treated as Related (Appendix P)," Sep. 2, 2015, p. 1-2.

Acevedo et al., "Freeing Up Mobile Network for Important Phone Calls in Case of Disaster," filed May 28, 2015, p. 1-35, U.S. Appl. No. 14/724,122.

Google, "Introducing Now cards," Google Now, p. 1-2, http://www.google.com/landing/now/, Accessed on Mar. 12, 2015.

Gryta, "Wireless Carriers Move to New Technology—for Voice," The Wall Street Journal, Feb. 25, 2013, p. 1-4, Dow Jones & Company, Inc., http://www.wsj.com/news/articles/SB10001424127887323699704578326361049129122, Accessed on Apr. 17, 2015.

Mell et al., "The NIST Definition of Cloud Computing," National Institute of Standards and Technology, Sep. 2011, p. 1-3, Special Publication 800-145.

Rosen et al., "Best Current Practice for Communications Services in Support of Emergency Calling," Internet Engineering Task Force (IETF), Mar. 2013, p. 1-28, IP.com No. IPCOM000225837D, IETF Trust.

Townsend et al., "Telecommunications Infrastructure in Disasters: Preparing Cities for Crisis Communications," New York University Center for Catastrophe Preparedness and Response, Apr. 2005, p. 1-45.

* cited by examiner

FREEING UP MOBILE NETWORK FOR IMPORTANT PHONE CALLS IN CASE OF DISASTER

BACKGROUND

The present invention relates generally to the field of computing, and more particularly to mobile network bandwidth conservation.

In disaster situations, family members and friends often attempt to contact people that have a possibility of being affected by the disaster to determine if the potentially affected people are safe. Concerned family members and friends will often generate a large volume of calls quickly overloads the mobile network servicing the area where the disaster occurred. When the mobile network servicing a disaster stricken area becomes overloaded from a large volume of calls, the network is no longer be able to provide service to people that are actually affected by the disaster and need access to a mobile network to obtain help.

SUMMARY

According to one exemplary embodiment, a method for reducing load on a mobile network after the occurrence of a disaster event is provided. The method may include receiving a disaster location and a disaster time. The method may also include determining a target area based on the received disaster location. The method may then include determining a plurality of target persons located within the determined target area. The method may further include predicting the location of each target person within the determined plurality of target persons based on a plurality of historical movement data associated with each target person within the plurality of target persons. The method may also include determining a plurality of filtered persons based on the predicted location of each target person within the plurality of target persons and the received disaster time. The method may then include determining a plurality of safe persons based on the plurality of filtered persons and a safety indicator. The method may further include sending a safety notification to a plurality of concerned contacts associated with each safe person within the determined plurality of safe persons.

According to another exemplary embodiment, a computer system for reducing load on a mobile network after the occurrence of a disaster event is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving a disaster location and a disaster time. The method may also include determining a target area based on the received disaster location. The method may then include determining a plurality of target persons located within the determined target area. The method may further include predicting the location of each target person within the determined plurality of target persons based on a plurality of historical movement data associated with each target person within the plurality of target persons. The method may also include determining a plurality of filtered persons based on the predicted location of each target person within the plurality of target persons and the received disaster time. The method may then include determining a plurality of safe persons based on the plurality of filtered persons and a safety indicator. The method may further include sending a safety notification to a plurality of concerned contacts associated with each safe person within the determined plurality of safe persons.

According to yet another exemplary embodiment, a computer program product for reducing load on a mobile network after the occurrence of a disaster event is provided. The computer program product may include one or more computer-readable storage devices and program instructions stored on at least one of the one or more tangible storage devices, the program instructions executable by a processor. The computer program product may include program instructions to receive a disaster location and a disaster time. The computer program product may also include program instructions to determine a target area based on the received disaster location. The computer program product may then include program instructions to determine a plurality of target persons located within the determined target area. The computer program product may further include program instructions to predict the location of each target person within the determined plurality of target persons based on a plurality of historical movement data associated with each target person within the plurality of target persons. The computer program product may also include program instructions to determine a plurality of filtered persons based on the predicted location of each target person within the plurality of target persons and the received disaster time. The computer program product may then include program instructions to determine a plurality of safe persons based on the plurality of filtered persons and a safety indicator. The computer program product may further include program instructions to send a safety notification to a plurality of concerned contacts associated with each safe person within the determined plurality of safe persons.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
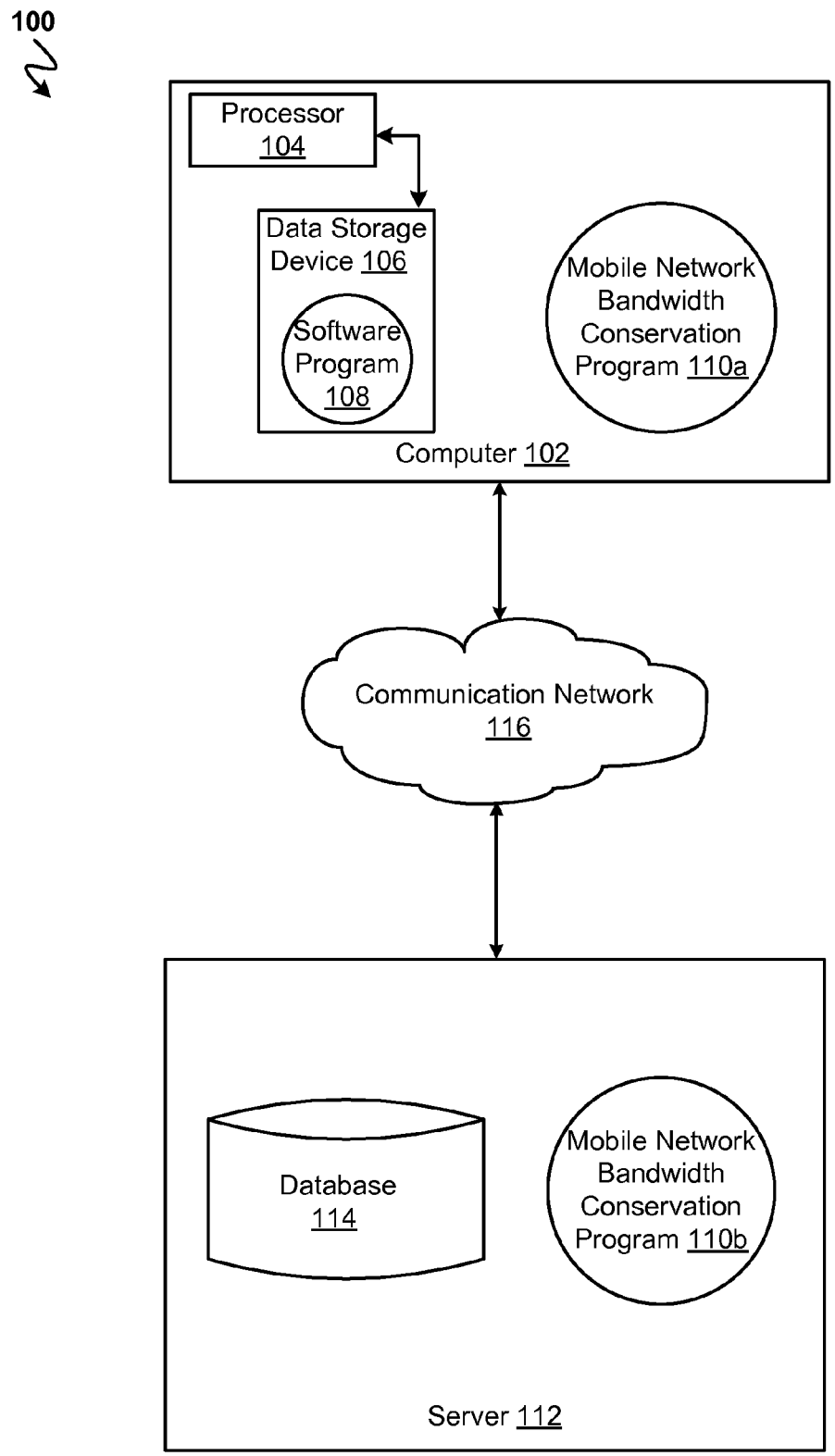
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for freeing up mobile network resources for important calls in response to a disaster event. As such, the present embodiment has the capacity to improve the technical field of mobile network bandwidth conservation by identifying a target population of people affected by a current disaster situation, verifying the safety of individuals within the target population, notifying family members and friends of safe people within the target population, and blocking network traffic to safe people within the target population. By notifying concerned family and friends that people within the target population are safe and blocking network traffic to safe persons, mobile network resources are left available for people that need access to the mobile network to obtain help.

As described above, in disaster situations, family members and friends often attempt to contact people that have a possibility of being affected by the disaster to determine if the potentially affected people are safe. A large volume of calls is often generated by concerned family members and friends that quickly overloads the mobile network servicing the disaster location. Many of the calls generated are not needed, as many people that had a possibility of being in the disaster location are not actually affected by the disaster. When the mobile network servicing a disaster stricken area becomes overloaded from the large volume of calls from concerned family members and friends, the mobile network is no longer be able to provide service to people that are actually affected by the disaster and need access to a mobile network to obtain help.

Therefore, it may be advantageous to, among other things, provide a way to reduce mobile network loads during a disaster event by informing concerned persons of the safety of people potentially affected by the disaster and blocking mobile network traffic (e.g., calls, data transmissions, etc.) to persons determined to be safe.

According to at least one embodiment, people agree to participate in disaster management and allow data to be collected regarding the participant's movement. Movement data includes recording data from global positioning system (GPS) devices (e.g., a GPS enabled smartphone a participant carries) or by determining a participant's work location or places a participant visits at certain times (e.g., a participant visits a restaurant every Friday night) from using social networking sites, calendar entries, or other known methods. The data collected will be used to predict where a participant may be located at any time by determining trends and emerging patterns based on the collected data. Collected data is stored in a data repository, such as a database, for retrieval later when a disaster event occurs. Additionally, information regarding each participant's concerned contacts (i.e., people that would be concerned about the participant's safety, such as family and friends) and how the participant's contacts may be contacted is stored (e.g., social networking site profiles for the participant's family and friends that will be used to send messages).

The participants that are likely be at the disaster location at the time the disaster occurred is predicted using the collected data (e.g., historical GPS data and derived trends). For example, a participant that is consistently at a friend's house located near the disaster location at the time the disaster occurred. The participants identified as being potentially affected by the disaster (i.e., high probability that the participant will be near the disaster location at the time the disaster occurs) are added to a target population pool. Participants in the target population have a high probability to have family and friends attempting to call (or otherwise load the mobile network in the disaster affected area) to determine the safety of participants within the target population. Based on, for example, current granular GPS data (e.g., from a GPS enabled smartphone on the participant's person showing the participant is outside the area affected by the disaster event) and from an affirmative response to a displayed notification that indicates that the participant in the target population is safe (e.g., a dialog box displayed on the participant's smartphone asking if the participant is safe and the participant touching an onscreen button indicating that the participant is safe), it will be determined if participants within the target population were not at the affected by the disaster event. Participants within the target population that are identified as being unaffected by the disaster event will then have concerned contacts (e.g., family and friends) notified of the unaffected participant's safety, thus concerned contacts may not feel the need to load the mobile network attempting to contact participants that are safe.

For participants determined to be unaffected by the disaster, alternative means of communicating (i.e., means that do not involve mobile networks servicing the disaster area) can be used to notify the participant's concerned contacts that the participant is safe. For example, if a participant that was predicted to be at the disaster location is determined to be unaffected by the disaster event based on current GPS location data and an affirmative response from the participant, the participant's concerned contacts are notified that the participant is safe by sending a message through a social networking site. The participants that have been determined to be safe are then given a notification (e.g., message on the participant's smartphone) to give the participant the option to agree to not receive phone calls or other mobile network load inducing transmissions (e.g., data transmissions) temporarily. Participants who agree to have network traffic temporarily blocked after the disaster event help to free up the mobile network bandwidth for calls and other transmissions involving people that were affected by the disaster and need help. Network traffic can be blocked at the mobile network provider (e.g., by blocking at cell phone towers), at the participant's electronic device (e.g., smartphone), using some other blocking method, or a combination of blocking methods.

Referring to FIG. 1, an exemplary networked computer environment 100 in accordance with one embodiment is depicted. The networked computer environment 100 will include a computer 102 with a processor 104 and a data storage device 106 that is enabled to run a software program 108 and a mobile network bandwidth conservation program 110a. The networked computer environment 100 will also include a server 112 that is enabled to run a mobile network bandwidth conservation program 110b that will interact with a database 114 and a communication network 116. The networked computer environment 100 will include a plurality of computers 102 and servers 112, only one of which is shown. The communication network will include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 communicates with the server computer 112 via the communications network 116. The communications network 116 includes connections, such as wire, wireless communication links, or fiber optic cables. As will be discussed with reference to FIG. 4, server computer 112 includes internal components 902a and external components 904a, respectively, and client computer 102 includes internal components 902b and external components 904b, respectively. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the mobile network bandwidth conservation program 110a, 110b may interact with a database 114 that can be embedded in various storage devices, such as, but not limited to a computer/mobile device 102, a networked server 112, or a cloud storage service.

According to the present embodiment, a user using a client computer 102 or a server computer 112 can use the mobile network bandwidth conservation program 110a, 110b (respectively) to free mobile network bandwidth by blocking calls and other network traffic (e.g., data transmissions) from concerned contacts (e.g., family members and friends) attempting to determine if a person is safe after a disaster when the person has already been determined to be unaffected by the disaster. The mobile network bandwidth conservation is explained in more detail below with respect to FIGS. 2 and 3.

Figure 2:
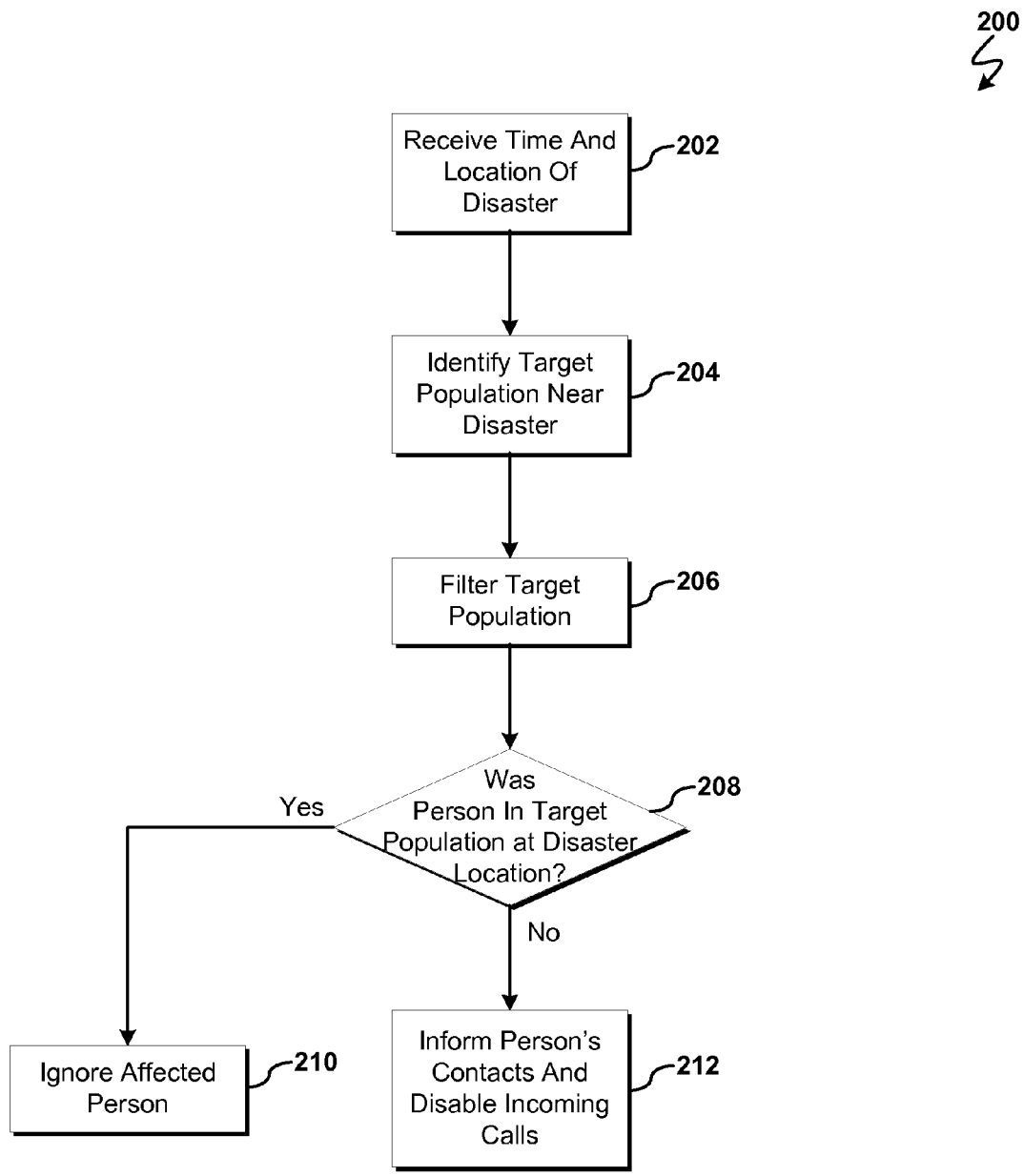
FIG. 2 is an operational flow chart illustrating a process for identifying affected persons and notifying contacts according to at least one embodiment.

Referring now to FIG. 2, an operational flow chart illustrating the exemplary steps 200 used by the mobile network bandwidth conservation program 110a and 110b (FIG. 1) according to at least one embodiment is depicted.

At 202 the time and location of a disaster event is received. According to at least one embodiment, an approved agency (e.g., government agency) broadcasts the time and location of a disaster event (e.g., earthquake) by using social networks, such as Facebook® (Facebook and all Facebook-based trademarks and logos are trademarks or registered trademarks of Facebook, Inc. and/or its affiliates). Disaster event information that is broadcast over a social network is intercepted and read using known methods. Alternatively, integration with a social networking site can be established before the disaster event, whereby the social networking site arranges to send details corresponding with a disaster event. According to at least one other embodiment, disaster information from trusted sources to be broadcast using other media, such as radio or other internet transmissions that are captured and parsed for relevant disaster information (e.g., time and location for the disaster event). Disaster information is then stored in a data repository, such as a database 114 (FIG. 1).

Next, at 204, a target population (i.e., target persons) is identified that is geographically near the disaster location. According to at least one embodiment, individuals are identified and added to the target population by accessing the stored disaster location information from step 202 and determining a target geographical area surrounding the disaster location that contains people that may be affected by the disaster event. The target geographical area is determined by using a predefined distance from the disaster location (e.g., 50 miles), by using a database of known areas around the location of the disaster that contains people likely to commute to the disaster location, etc. For example, if a disaster event occurred in New York City, the target geographical area considered for the target population may be determined to include people within a 50 mile radius of the disaster location (e.g., people residing in parts of New York, Connecticut, and New Jersey).

Location information is obtained through social networking sites to determine if persons are located within the target geographical area. For example, the target geographical area can be defined as zip codes covering geographical areas within 50 miles of the disaster location. A social networking site is then searched for persons having home addresses within the zip codes that are included in the target geographical area. It may be appreciated that other ways of determining a person's locations can be used, such as accessing databases of phone book listings, etc.

Persons identified as the target population are represented and stored in a data repository, such as a database 114 (FIG. 1), as entries containing the person's identification information (e.g., name, home address, work address, phone number, email, social networking site profile uniform resource locator address, etc.).

Then, at 206, the target population is filtered to determine the persons within the target population that are likely to have been present at the disaster location at the time the disaster occurred. According to at least one embodiment, movement data collected showing the movement patterns and emerging trends of movement corresponding to persons within the target population are used to determine the persons within the target population that are likely to be at the disaster location at the time the disaster occurred. Collecting movement data, determining movement patterns, and determining emerging movement trends to predict an individual's location will be discussed in detail below with respect to FIG. 3.

According to at least one embodiment, predicting an individual's location is handled by a separate service (e.g., movement service 300 (FIG. 3)) that is queried to provide a prediction for where a person within the target population will be at the time of the disaster event. A query is sent having an identifier corresponding with the person in the target population and the time the disaster event occurred. In response, a predicted location of where the person is located at the time of the disaster event is received.

Based on the predicted locations received for persons within the target population at the time of the disaster event, the target population is filtered to include only persons that were predicted to be at, or near, the disaster location (i.e., within the risk area where people would have likely been affected by the disaster event) at the time the disaster occurred. The filtered target population thus reflects the persons most likely to be affected by the disaster event and represents the persons most likely to have concerned family and friends use mobile network bandwidth attempting to verify the person's safety (e.g., via a phone call).

At 208 it is determined if persons within the filtered target population were at the disaster location at the time the disaster occurred. According to at least one embodiment, the actual location of each person within the filtered target population at the time of the disaster event is determined using GPS location data. GPS data indicating the person's location is obtained, for example, by reading location data from a GPS device carried by the person, such as the person's smartphone. By examining the person's location at, or near, the time the disaster occurred, it can be determined that the person was not within a predetermined distance from the disaster event at the time the disaster event occurred and thus is unaffected by the disaster event. The predetermined distance from the location of the disaster can be a fixed distance (e.g., five miles) or the distance that is dynamically determined based on the type of disaster event (e.g., a building fire would only have a predetermined distance covering a few square blocks while an earthquake would have a predetermined distance encompassing many square miles).

If a person was found to be within the predetermined distance from the disaster location at the time the disaster occurred at 208, that person may have been affected by the disaster event and is ignored for mobile network bandwidth conservation purposes in order to allow affected persons to fully use mobile network resources to obtain help at 210.

However, if a person was determined to not be within the predetermined distance from the disaster location at the time the disaster occurred at 208, the person's concerned contacts (e.g., family members and friends) will be informed that the person is safe and incoming calls (and other network traffic) to the person are disabled at 212. According to at least one embodiment, a dialog box or other notification is displayed on the person's smartphone asking that the person verify that the person is unaffected by the disaster event (i.e., that the person is safe). If the person indicates that the person is unaffected by the disaster event, the person's concerned contacts (e.g., family and friends) are notified of the person's safety. Additionally, the person is given a choice (e.g., through a dialog box or other user interface means) to indicate if the person is willing to have incoming calls and other mobile network traffic temporarily disabled to conserve mobile network bandwidth for persons who could be affected by the disaster event and need to use the mobile network to obtain help.

The person's concerned contacts are determined, for example, from the person's social network profile, a phonebook saved on the person's phone, a personal calendar (e.g., a calendar application on the person's smartphone), the person's email contacts, or manually entered by the person after the person consents to having contact information stored and used for disaster management purposes as will be described below with reference to FIG. 3. The person's concerned contacts can be notified using automatically generated social network site messages, text messages, phone calls, emails, etc. indicating that the person is safe. Thus, the person's concerned contacts are able to verify the person is safe without having to use mobile network bandwidth to call or otherwise contact the person. Additionally, if the person indicates that the person agrees to have mobile network traffic (e.g., phone calls, data transmissions, etc.) temporarily blocked, anyone attempting to use the mobile network to contact the person (e.g., making a phone call) is blocked for a period of time (e.g., a predetermined amount of time, when an approved agency declares disaster response operations over, the mobile network provider determines that the mobile network can handle the expected load, etc.) following the disaster event to avoid using mobile network bandwidth that remains free for people who need help due to the disaster event.

Figure 3:
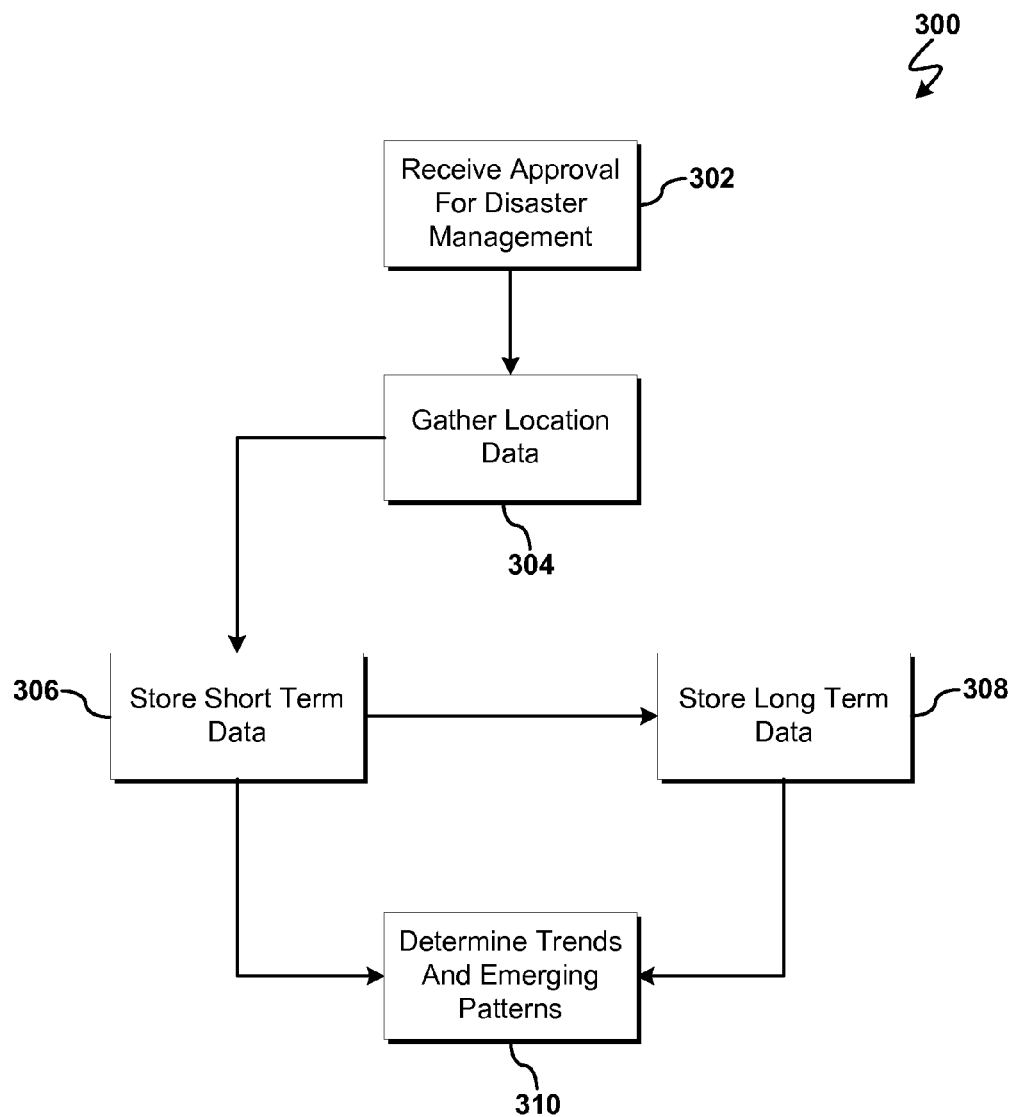
FIG. 3 is an operational flow chart illustrating a process for continuous movement trend determination according to at least one embodiment.

Referring now to FIG. 3, an operational flow chart illustrating the exemplary steps of a movement service 300 used to predict a person's location by continuously determining movement trends and patterns according to at least one embodiment is depicted.

At 302 approval from a person to participate in disaster management is received. According to at least one embodiment, before a disaster event occurs, a person indicates approval (i.e., consent) to participate in disaster management provided by the mobile network bandwidth conservation program 110a and 110b (FIG. 1). For example, the person may communicate approval to participate with disaster management by using a frontend application downloaded to the person's smartphone, or through a website, etc. The person is then presented with a dialog box or other displayed notice that describes to the person what information will be tracked and obtained from the person in order to participate in the system. Then, the person is informed that GPS location data regarding the person's location at any given time will be collected, the person's contacts will be read and stored, and the person's calendar information will also be read and stored. Additionally, the person is presented with a button or other user interface feature to affirmatively indicate that the person approves of the data collection needed to participate in disaster management. The indicator used to represent the person's approval is then relayed to the movement service 300 and received at 302.

Next, at 304, location data corresponding with the participant is gathered. According to at least one embodiment, location data (i.e., location value) is gathered from a GPS receiver contained within the participant's smartphone or other electronic device that the participant carries regularly. Other location information can also be collected, such as reading the participant's calendar to determine specific locations the person has entered on a personal calendar and the date and time the participant intends to be at the calendared locations. Furthermore, location information regarding a participant's movements can be read from social networking site postings. It may be appreciated that location information can be gathered from other sources or from a combination of sources. Additionally, a personal identifier for the participant (e.g., participant's name) and the participant's address (e.g., home address, work address, etc.) is stored in a data repository, such as a database 114 (FIG. 1) once a person has agreed to participate in disaster management.

Then, at 306, short term location data is stored. According to at least one embodiment, short term location data is stored in a data repository, such as a database 114 (FIG. 1) with high granularity (i.e., location data read and stored at short time intervals) for a limited amount of time (e.g., 24 hours). The high granularity of the data gives an accurate depiction of where the participant is located at any time, however the data may not accurately predict where a participant will be in the future. For example, short term location data collected on a Sunday may not be an accurate indicator of where the participant will be on the following day (i.e., Monday) if the participant is starting a workweek. However, short term location data taken on a Tuesday may provide accurate predictive data for the next day (i.e., Wednesday) if the participant follows a consistent routine during weekdays.

At 308, long term location data is stored. According to at least one embodiment, long term location data is stored in a data repository, such as a database 114 (FIG. 1) with lower granularity for an extended amount of time (e.g., 24 hours to 6 months). As short term data stored in 306 ages to a predefined threshold (e.g., 24 hours), that short term location data is converted into long term location data and stored in a data repository. To convert high granularity location data to long term low granular data, data points within the high granular location data is removed. For example, only location data corresponding to every 3 hours may be saved while the other location data is deleted, or only location data corresponding to a change in location exceeding a distance threshold (e.g., 4 miles) is saved, etc. The data stored in lower granularity as long term location data may include enough data points to detect patterns over a week (e.g., some of the locations a participant is at on a weekend afternoon versus a weekday afternoon), or months (e.g., how the participant's movement patterns differ in the summer versus in the winter).

Next, at 310, analysis is performed using short term location data and long term location data to determine trends and emerging patterns. According to at least one embodiment, known analytics methods are applied to the short term and long term data to determine a participant's movement trends and emerging patterns. For example, the high granularity short term data can be filtered as it ages (e.g., when the data becomes old enough to be removed from short term storage) to retain important data points that can be used to update long term location data. Thus, if a participant's movement patterns suddenly change (e.g., the participant started a new job), over time the long term data will eventually reflect the change in movement patterns. Additionally, by using analytics, emerging patterns are determined before long term location data is updated to show new patterns of movement. For example, if a participant has started at a new job that is at a different location then the participant's previous job, the participant's movement pattern will change. After two weeks, the long term location data may not indicate that a participant will likely be at the location of the new job, however analytics can determine that a participant will likely be at the location of the new job based on the data showing that the participant has consistently been travelling there for two consecutive weeks.

According to at least one embodiment, location data analysis is performed at regular intervals to have accurate predictive location data immediately available when queried at step 206 (FIG. 2). Thus, the computer systems (e.g., computer 102 and server 112 (FIG. 1)) performing location analysis for each participant within the target population will not be overloaded by computing resource intensive analysis for a large number of participant at one time and results are returned faster to allow quicker response in the aftermath of a disaster event.

It may be appreciated that FIGS. 2 and 3 provide only an illustration of one embodiment and does not imply any limitations with regard to how different embodiments may be implemented. Many modifications to the depicted embodiment(s) may be made based on design and implementation requirements.

Figure 4:
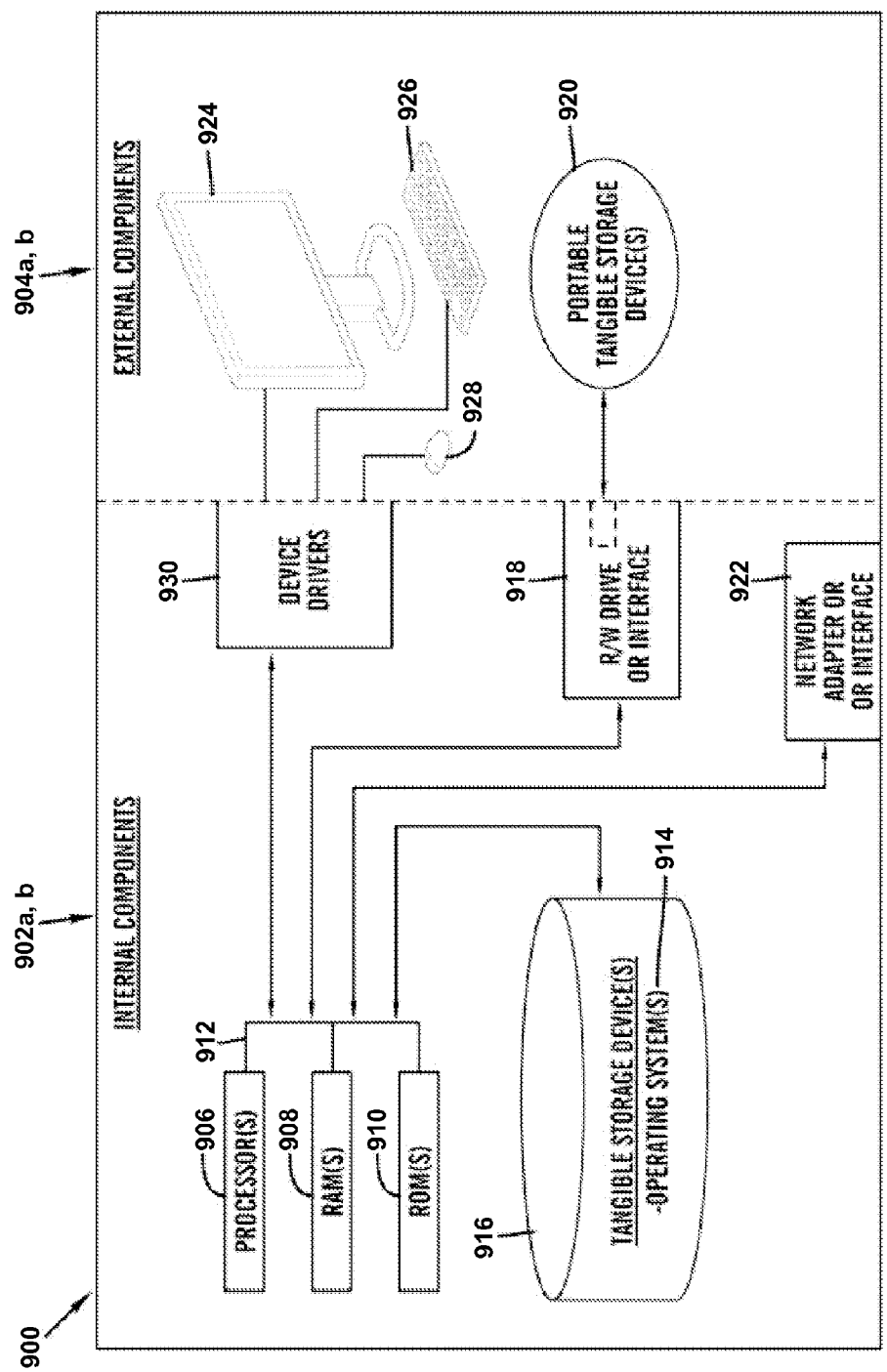
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 902 a, b and external components 904 a, b illustrated in FIG. 4. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914 and the software program 108 (FIG. 1) and the mobile network bandwidth conservation program 110a (FIG. 1) in client computer 102 (FIG. 1) and the mobile network bandwidth conservation program 110b (FIG. 1) in network server 112 (FIG. 1), may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 (FIG. 1) and the mobile network bandwidth conservation program 110a and 110b (FIG. 1) can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 (FIG. 1) and the mobile network bandwidth conservation program 110a (FIG. 1) in client computer 102 (FIG. 1) and the mobile network bandwidth conservation program 110b (FIG. 1) in network server computer 112 (FIG. 1) can be downloaded from an external computer (e.g., server) via a network (for example, the Internet, a local area network or other, wide area network) and respective network adapters or interfaces 922. From the network adapters (or switch port adaptors) or interfaces 922, the software program 108 (FIG. 1) and the mobile network bandwidth conservation program 110a (FIG. 1) in client computer 102 (FIG. 1) and the mobile network bandwidth conservation program 110b (FIG. 1) in network server computer 112 (FIG. 1) are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
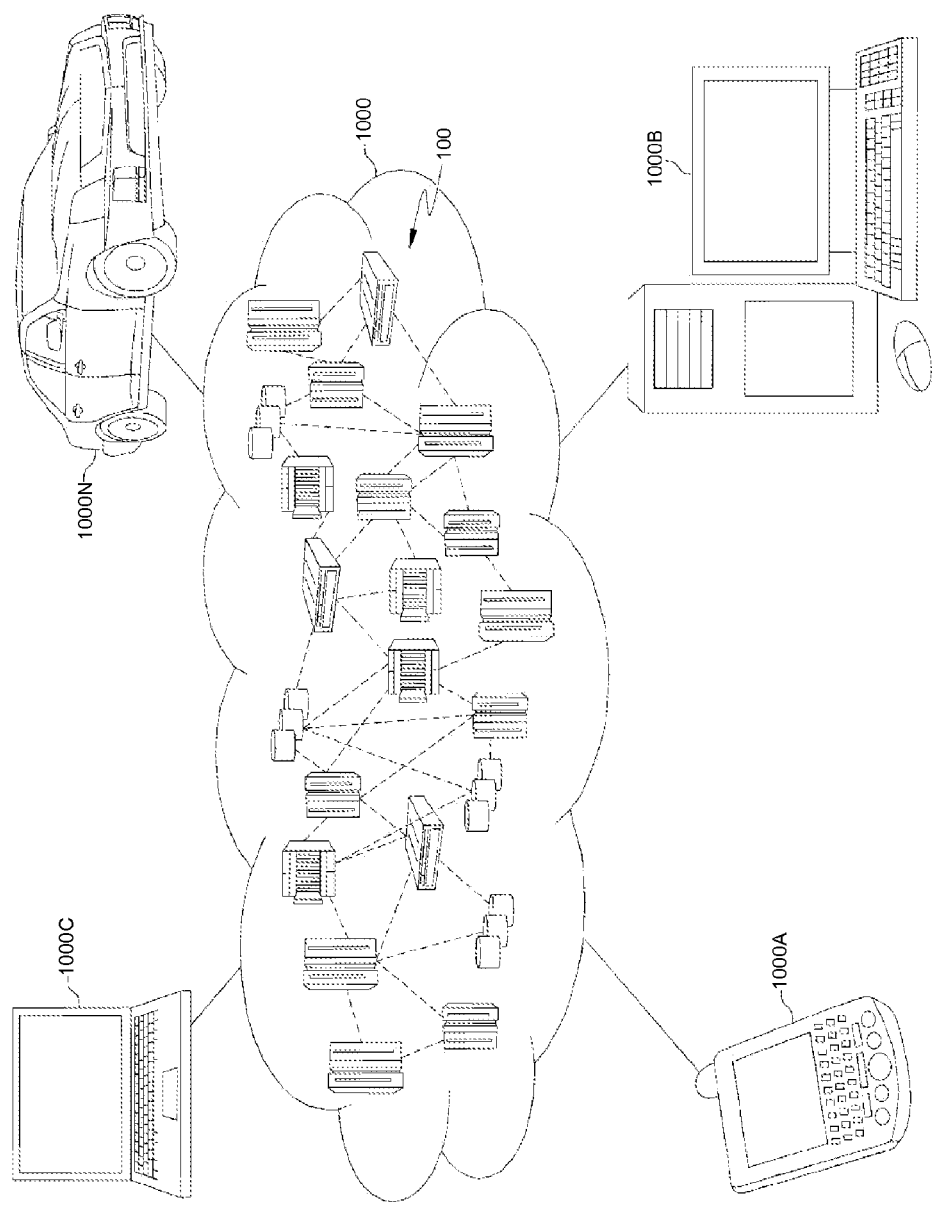
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
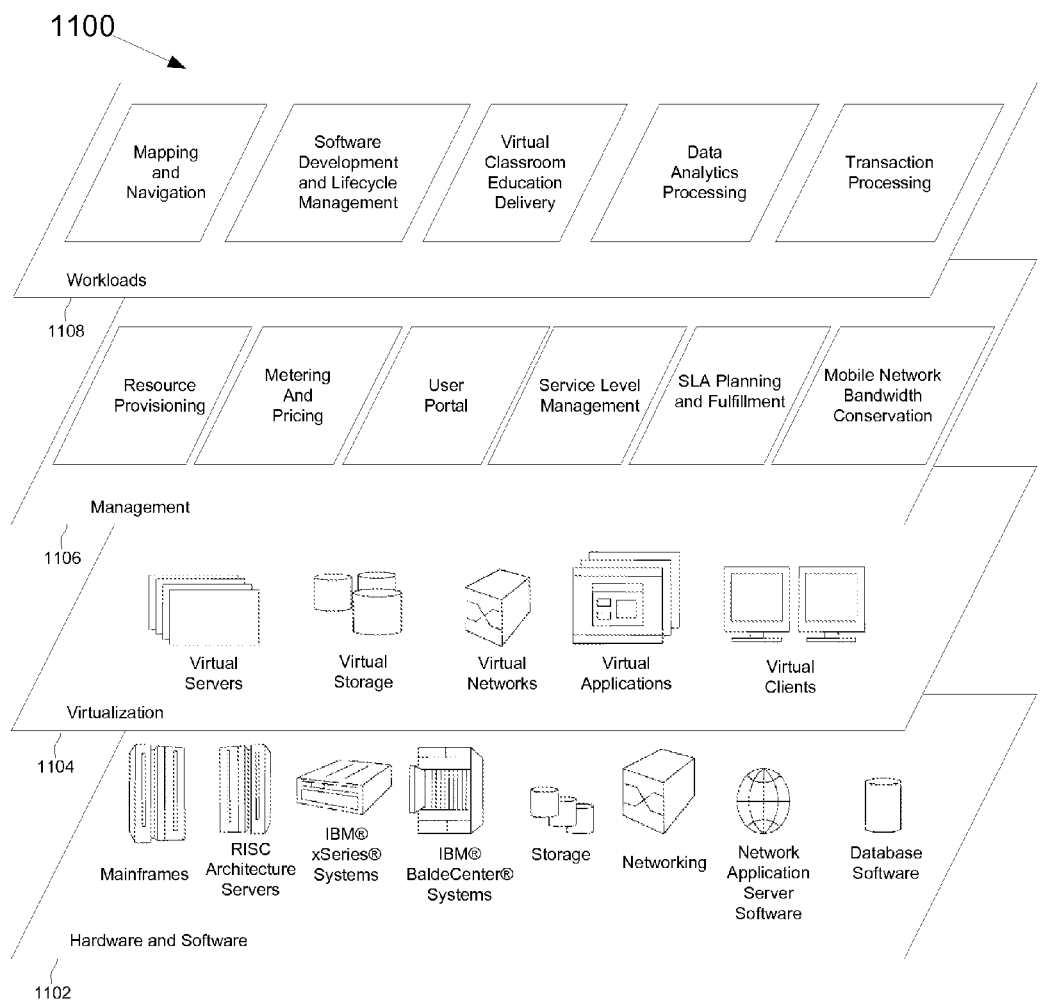
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes; RISC (Reduced Instruction Set Computer) architecture based servers; storage devices; networks and networking components. In some embodiments, software components include network application server software.

Virtualization layer 1104 provides an abstraction layer from which the following examples of virtual entities may be provided: virtual servers; virtual storage; virtual networks, including virtual private networks; virtual applications and operating systems; and virtual clients.

In one example, management layer 1106 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. Mobile network bandwidth conservation may provide a way to reduce mobile network bandwidth load in disaster situations when mobile network bandwidth may otherwise become overloaded and leave the mobile network without resources to service people affected by the disaster that may need to use the mobile network to obtain assistance.

Workloads layer 1108 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for reducing load on a mobile network after the occurrence of a disaster event, the method comprising:
   receiving a disaster location and a disaster time;
   determining a target area based on the received disaster location;
   determining a plurality of target persons located within the determined target area;
   predicting the location of each target person within the determined plurality of target persons based on a plurality of historical movement data associated with each target person within the plurality of target persons;
   determining a plurality of filtered persons based on the predicted location of each target person within the plurality of target persons and the received disaster time, wherein determining the plurality of filtered persons based on the predicted location of each target person within the plurality of target persons and the received disaster time comprises the plurality of target persons remaining after removing a plurality of unaffected persons from the plurality of target persons based on determining that the predicted location of each unaffected person within the plurality of unaffected persons is outside a risk area and wherein the risk area is affected by the disaster event;
   determining a plurality of safe persons based on the plurality of filtered persons and a safety indicator; and
   sending a safety notification to a plurality of concerned contacts associated with each safe person within the determined plurality of safe persons.

2. The method of claim 1, further comprising:
   blocking a plurality of network traffic associated with each safe person within the determined plurality of safe persons for a time period following the disaster time.

3. The method of claim 1, wherein receiving the disaster location and the disaster time comprises querying a social networking site for the disaster location and the disaster time or configuring the social networking site to send the disaster location and the disaster time in response to the disaster event.

4. The method of claim 1, wherein determining the target area comprises identifying a geographic area containing the received disaster location and a plurality of areas surrounding the received disaster location.

5. The method of claim 1, wherein the plurality of target persons comprises a personal identifier and an address associated with each target person within the plurality of target persons.

6. The method of claim 5, wherein determining the plurality of target persons located within the determined target area comprises determining if the address associated with each target person within the plurality of target persons is within the target area.

7. The method of claim 1, wherein the plurality of historical movement data for each target person within the plurality of target persons comprises at least one of a global positioning system (GPS) location value from a GPS enable device and a calendared event location.

8. The method of claim 1, wherein predicting the location of each target person within the determined plurality of target persons based on a plurality of historical movement data associated with each target person within the plurality of target persons comprises storing the plurality of historical movement data for each target person within the plurality of target persons over a time period and analyzing the plurality of historical movement data to determine a plurality of movement patterns to use in conjunction with the disaster location and disaster time to predict the location of each target person within the determined plurality of target persons at the disaster time.

9. The method of claim 1, wherein the safety indicator comprises at least one of a current GPS location and an affirmative safety response.

10. The method of claim 1, wherein the safety notification comprises at least one of a social network message, a text message, an email message, and a phone call.

* * * * *